United States Patent [19]
Chang

[11] Patent Number: 5,675,468
[45] Date of Patent: Oct. 7, 1997

[54] APPARATUS AND METHOD FOR PROTECTING EQUIPMENT AGAINST ELECTRICAL POWER SURGES

[76] Inventor: Pak Chuen Chang, 30 Lorong Kurau 9,Taman Sg. Abong.8400 Muar, Johor, Malaysia

[21] Appl. No.: 551,468

[22] Filed: Nov. 1, 1995

[30] Foreign Application Priority Data

Nov. 8, 1994 [MY] Malaysia ............................ PI 9402964

[51] Int. Cl.$^6$ ...................................................... H02H 1/00
[52] U.S. Cl. ............................................ 361/119; 361/111
[58] Field of Search ................................. 361/111, 117, 361/119, 127, 124, 56

[56] References Cited

U.S. PATENT DOCUMENTS 4,849,846  7/1989  Hung et al. ............................... 361/56
5,341,269  8/1994  Hayward et al. ........................ 361/119
5,428,494  6/1995  Ahuja ........................................ 361/62

Primary Examiner—Jeffrey A. Gaffin
Assistant Examiner—Sally Medley
Attorney, Agent, or Firm—Lowe, Price, LeBlanc & Becker

[57] ABSTRACT

Apparatus and method for protecting equipment against electrical power surges which is not 'ground-centered'. A protection circuit in accordance with this invention comprises at least (a) two input terminals, (b) two fuses in series respectively, (c) a triac which is over-current activated and connected at outputs of the fuses, (d) an over-current sensor in series between one of the fuses and an output terminal, to activate the triac, and (e) a static potential limiter which is overvoltage activated and connected between the triac and a ground terminal. Each fuse is appropriately rated to blow before the activated triac or the activated static potential limiter of the protection circuit are destroyed.

18 Claims, 4 Drawing Sheets

VARISTORS

GAS TUBES

APPARATUS AND METHOD FOR PROTECTING EQUIPMENT AGAINST ELECTRICAL POWER SURGES

FIELD OF THE INVENTION

This invention relates to apparatus and a method for protecting equipment containing electronic circuitry against harm from electrical power surges, and more particularly to apparatus and a method for protecting electronic equipment, located between equipment circuits(s) that need to be protected and external connection(s), by absorbing/isolating harmful surges such as those from lightning strikes.

BACKGROUND OF THE INVENTION

It is common knowledge that lightning surges cause the world to lose large amounts of money to replace damaged equipment, especially electronic equipment with one or more external power source connection(s). These external connections to energy supply and/or communications lines can bring into the equipment circuit(s) high energy surges during a severe lightning strike on or near these external line(s). These surges which are experienced within each source, or between two or more sources and/or in relation to ground means, can be of the order of tens of thousands of volts for durations lasting from 10 micro-seconds to a couple of seconds. The lack of a perfect protection method explains why manufacturers of equipment refuse to honor warranty claims resulting from such surges and manage to get away with it. In self defense many users of such equipment resort to disconnecting the equipment from external source(s) when not in use, and during a thunderstorm even when use is desirable.

By this invention, all these disadvantages will be eliminated, because loss from even a very severe surge can be reduced to just the replacement of one or more isolation means, such as fuse(s), which can be replaced inexpensively.

DESCRIPTION OF THE RELATED ART

Various methods to protect electronic equipment are in use and can be characterized as follows:

(a) The clamping method employs one or more clamping means such as varistor(s) or gas arrestors connected in parallel to the equipment circuit(s) to limit electrical surge by absorbing excess voltage, but allows excess current to flow through equipment if a predetermined clamping voltage is not reached. The clamping means are easily damaged to become open-circuited without anyone noticing it after a severe lightning strike.

(b) The isolating method employs one or more isolation means connected in series in the circuit(s) to become open-circuited when excess current flows through them long enough, and also allows the excess current to flow through equipment until the isolation means become open-circuited. The time and excess current required to cause open-circuit can be too much since the equipment, being in series, is also exposed to the same hazardous excess current.

(c) The combination method combines the clamping and isolating methods, and may be the best of prior art methods, providing near perfect protection for the first severe surge or several surges until the clamping means become open-circuited or non-functional without anyone noticing it until equipment is damaged during the next surge.

In most if not all of the prior art methods, not enough emphasis is put into ensuring that the static potentials, which exist in one or more source inputs and which can cause intercircuit sparking damages, are positively limited or coordinated to a common ground reference and making sure the clamping means will never become open-circuited.

SUMMARY OF THE INVENTION

Accordingly, a principal object of this invention is to provide between power supply connections and vulnerable circuits selectively connected and inexpensive surge protective elements to avert damage due to lightning strikes.

Another object is to provide protection against externally imposed high voltage or high current surges to a circuit which includes antenna lines of either a receiving device or a transmitting device.

Yet another object is to protect against electrical surge damage to separate but cooperating electrical circuits coordinated to a common ground means.

An even further object is to provide protection against electrical surge damage to sensitive electrical equipment, by connecting between that equipment and external lines such as power supply, telecommunication, antenna or data lines, a unit incorporating a combination of protective elements that act to limit the voltage or current permitted to reach the protected equipment.

In another aspect of the invention there is provided a method of providing sacrificial circuit elements which create open-circuit conditions to ensure vital components do not fail when subjected to electrical power surge to thereby protect sensitive equipment against overvoltage or overcurrent harm.

Yet another aspect of the invention is the non-reliance on ground route in the circuit to protect equipment. Even though "ground/earth means" are mentioned, they can be floating grounds, reference points or equipment grounds or circuit grounds where inter-circuit potential differences need to be limited or coordinated, whenever two or more input sources are present.

A further aspect of the invention is the absence of reliance on voltage sensing which is essential in other protection circuits.

The foregoing objects are realized in accordance with the present invention by providing an apparatus for protecting sensitive electrical equipment against harm from a power surge, which receives electrical input at first and second input means and protectively delivers an electrical output at first and second output means, comprising:

first isolation means connected in series between the first input means and the first output means;

second isolation means connected in series between the second input means and the second output means;

absorbing means connected in parallel at the outputs of the first and second isolation means before the first and second output means;

overcurrent sensing means connected in series between the output of an isolation means and one of the first and second output means; and a static potential limiting means connected in series with the absorbing means and ground means;

wherein, an electrical surge experienced by the overcurrent sensing means will set the protection circuit in motion.

In another aspect of this invention there is provided a method of absorbing and isolating harmful electrical surge, for equipment-circuit protection, comprising the steps of:

providing a circuit with at least two output means, two isolation means respectively connected in series with the two input means, an absorbing means connected in parallel with the two output means, an overcurrent sensing means connected in series between an isolation means and one of two output means, and a static potential limiting means, such that each input means is first connected to a selected isolation means which will (a) surely protect the absorbing means which will be activated to become short-circuited when a predetermined level of overcurrent is detected by the overcurrent sensing means in order to prevent harmful in-circuit surge from reaching the equipment-circuit via the output means, and (b) surely protect the static potential limiting means which prevents harmful inter-circuit voltage surge, in relation to ground potential, from reaching the equipment-circuit Detailed descriptions of various aspects of this invention clarify how it represents a significant step toward preventing serious equipment damage and related expenses causable by lightning surges since this invention even protects the components employed to protect sensitive equipment/circuits.

DETAILED DESCRIPTION OF THE PREFERRED EMBODIMENTS

Figure 1:
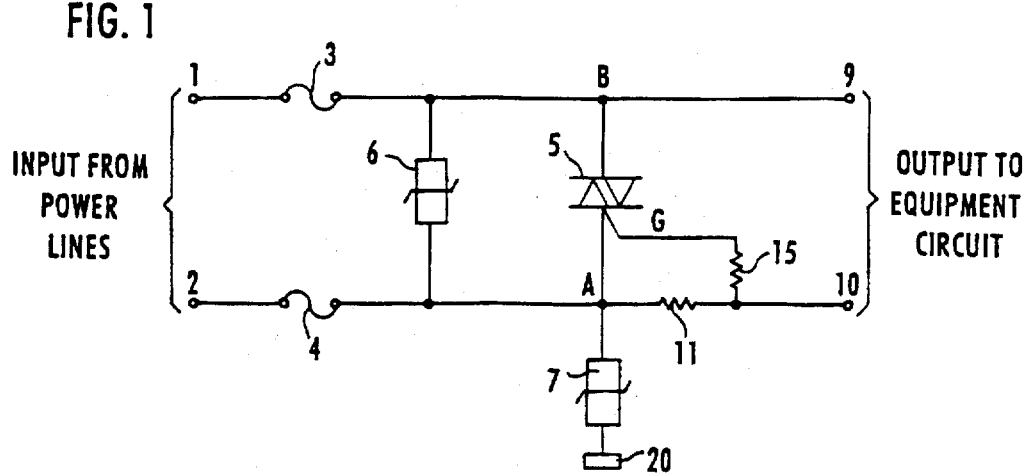
FIG. 1 shows a protection circuit according to one embodiment of the invention.

FIG. 1 shows an arrangement in accordance with a preferred embodiment of this invention, suitable for connection between electrical energy supply connections 1, 2 and output connections 9, 10 connected to sensitive equipment or circuits.

Isolation elements 3 and 4 preferably are glass-shielded fuses of the lowest possible current rating acceptable for normal operation of the equipment or circuit(s) being protected. Absorbing element 5 can be a TRIAC having a break-down voltage which is approximately double that of the normal operating voltage of the equipment being protected. Absorbing element 5 can be activated to become short-circuited, absorbing all energy delivered via the isolation elements 3 and 4 until one or both of these isolation elements become open-circuited without itself being damaged. This is done by providing a current at 'G' by overcurrent sensing element 11 which is selected so that, according to Ohm's Law, it will provide a voltage delivering sufficient current at 'G' to activate the TRIAC when a predetermined over-current is detected.

For example, if the normal maximum operating current for the equipment is 1 amp at 230 V a.c., the predetermined over-current may be set to be 2 A. Assuming the voltage required at 'G' to activate the TRIAC is 1 V according to Ohm's Law, the series resistor required as an over-current sensing element 11 should be 0.5 ohm, with a heat dissipation rating of at least 2 W.

The isolation elements 3 and 4 may be conventional fuses of 1.5 A rating, and the absorbing element 5 TRIAC preferably shall be rated at 8 A.

Static potential limiting element 7 preferably comprise Metal Oxide Varistor(s) of diameter 13 mm to 15 mm, rated at 300 Vrms.

For practical purposes, to avoid having to replace fuses such as 3 or 4 too often due to potentially non-damaging surges of very short durations, a clamping element 6 may be added in parallel to the absorbing element 5. This clamping element 6 can be a varistor of 300 Vrms, preferably of diameter 13 mm to 15 mm. A current limiting resistor 15 may also be added to protect absorbing element 5.

Figure 2:
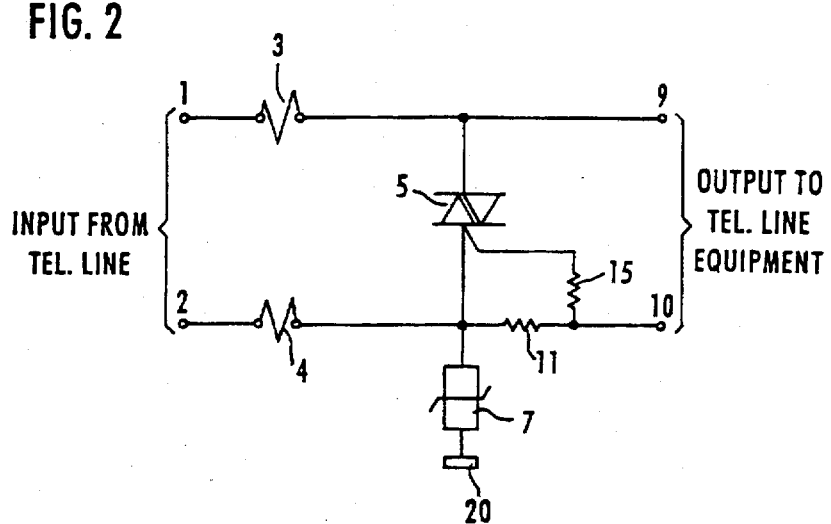
FIG. 2 shows a protection circuit of second embodiment of the invention.

FIG. 2 shows a circuit in accordance with the present invention adopted to connect between a telecommunications source at 1 and 2 and equipment circuit at 9 and 10.

For many applications, the isolation elements 3, 4 in this arrangement can be resistors of 0.5 W rating, with values from 22 ohms to 47 ohms each. Absorbing element 5 can be a TRIAC rated at 2 A/200V or higher. Over-current sensing element 11 can be 2.7 ohms of 0.5 W rating. The static potential limiting element 7 can be varistor(s) of 9 mm to 13 mm diameter operating at 300 Vrms.

A typical telecommunications subscriber line circuit operates on maximum 96 Vac during ringing and 48 Vdc during standby, and the operating current is normally limited to approximately 30 mA at about 10 V during 'off-hook' or in-use conditions. In practice, multiple parallel extensions may be connected to a single source, with the ringing circuit capacitor for each extension connected so that when any one of the equipment is in use the initial current can be way above the normal limit of about 30 mA. The selection of current sensing element 11 to be 2–7 ohms thus actually predetermines the over-current at more than 300 mA, which is still considered safe for the equipment circuit for a split second.

Selections of the isolation elements 3 and 4 and absorbing element 5 thus ensures that the absorbing element 5 will almost never be damaged under any surge condition unless the resistors used for isolation elements 3 and 4 become shorted when blown. The choice of carbon film resistors for 3 and 4 will ensure that they do not become shorted.

When an over-voltage occurs in relation to ground, a static potential limiting element 7, such as a metal oxide varistor of 300 Vrms, will typically absorb whatever excess voltage is experienced, and while doing so, isolation mean (s) 3 and/or 4 will serve to protect this varistor.

This arrangement and selection of components makes it virtually impossible to damage any equipment protected by this invention.

Since the absorbing element 5 reacts very quickly to any surge, and isolation takes place almost immediately, the deafening noise typically caused by a lightning surge and which may cause a telephone user's hearing to become damaged does not arise, and the user is thus rendered safe from high voltage static discharge as well.

Figure 3:
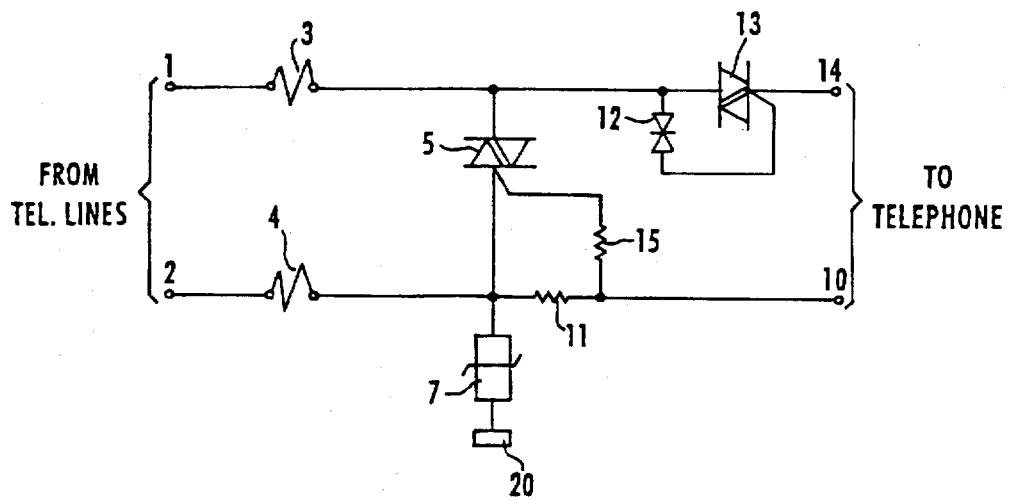
FIG. 3 shows a protection circuit as described in FIG. 2 with an additional DIAC and a TRIAC.

FIG. 3 shows a circuit in accordance with the present invention as described earlier in relation to FIG. 2, with the addition of a 30 V DIAC 12 and a TRIAC 13 of 0.8 A/200 V. These additions are for the purpose of enabling the equipment connected to output elements 14 and 10 to be protected from harmful surge as well as to be denied access if any one of one or more equipment connected in parallel to the same source as input elements 1 and 2 is already in use or 'off-hook'. The desired line-in-use isolation effect is achieved by the fact that an in-use voltage of below 20 volts cannot trigger a 30 V DIAC 12 to switch on TRIAC 13 for the equipment to be connected through the latter.

Figure 4:
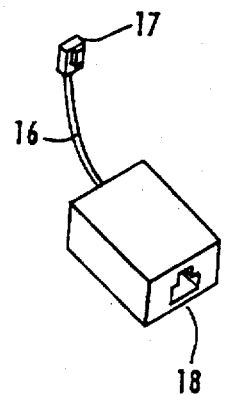
FIG. 4 shows a module incorporating either the circuit of FIG. 2 or of FIG. 3.

FIG. 4 shows an individual embodiment containing either the circuit described as in FIG. 2 or as in FIG. 3, complete with or without connecting element such as a length of cable 16 ending in plug 17 for easy interface between telecommunications or data communications equipment connected at modular socket 18 and a conventional power source.

The specific arrangement of the components is vital for achieving the main aim of this invention, i.e., to protect the components employed to protect the equipment-circuit by elements of the isolation element. Additional elements such as indicating elments to show isolation, i.e., whether the protection elements are open-circuited, or the state of a combination of components to form the over-current sensing elements, are optionally included.

The specific selections of components are such that the isolation elements are of the lowest possible current rating for normal operations of the equipment, to provide the best possible protection to all components. The absorbing element 5 and static potential limiting element 7 are chosen to be of power ratings as high as possible, subject to cost and/or space constraints, but at least five times more durable and/or capable to absorb, without damage, all the energy delivered before the isolation elements open-circuit. This combination of ratings will ensure, under any surge conditions, that the only component(s) to be damaged will be the isolation elements 3, 4 such as fuse(s) which can be easily and inexpensively replaced.

Once the predetermined current is detected by the over-current sensing elements, and within nano-seconds, the absorbing element such as the TRIAC 5 will become short-circuited, thus ensuring that the equipment circuit connected to the output element of this invention will be exposed to nearly zero volts while one or more isolation elements 3, 4 such as fuse(s) forming the weakest link(s) in the circuit will quickly blow to be in an open-circuit state to protect the absorbing element 5 and/or static potential limiting element 7. From the time the absorbing element 5 is activated, to the time the isolation elements 3, 4 become open-circuited, the equipment circuit connected to the output element 9. 10 is never exposed to any hazardous voltage. That element that the equipment circuit is exposed to unacceptable high voltage only until the predetermined over-current level is detected.

Figure 5:
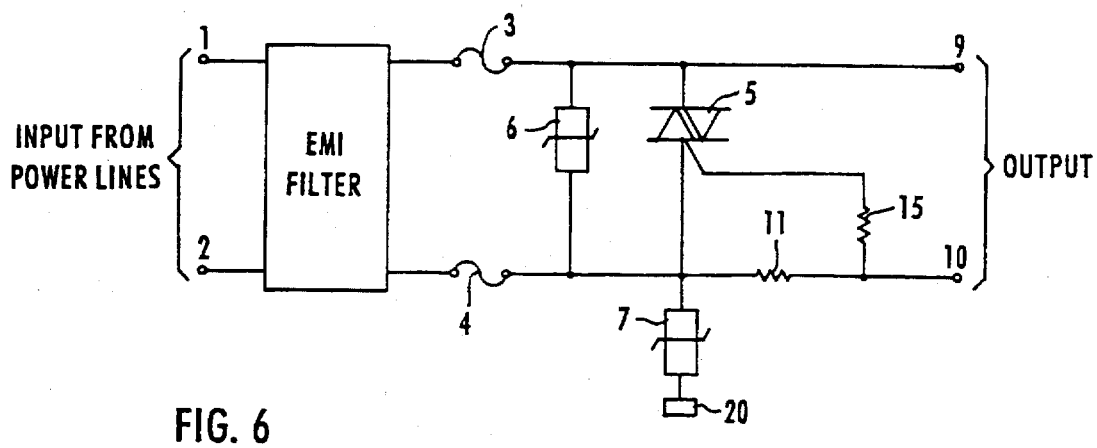
FIG. 5 shows an EMI filter added to the protection circuit of FIG. 1.
Figure 6:
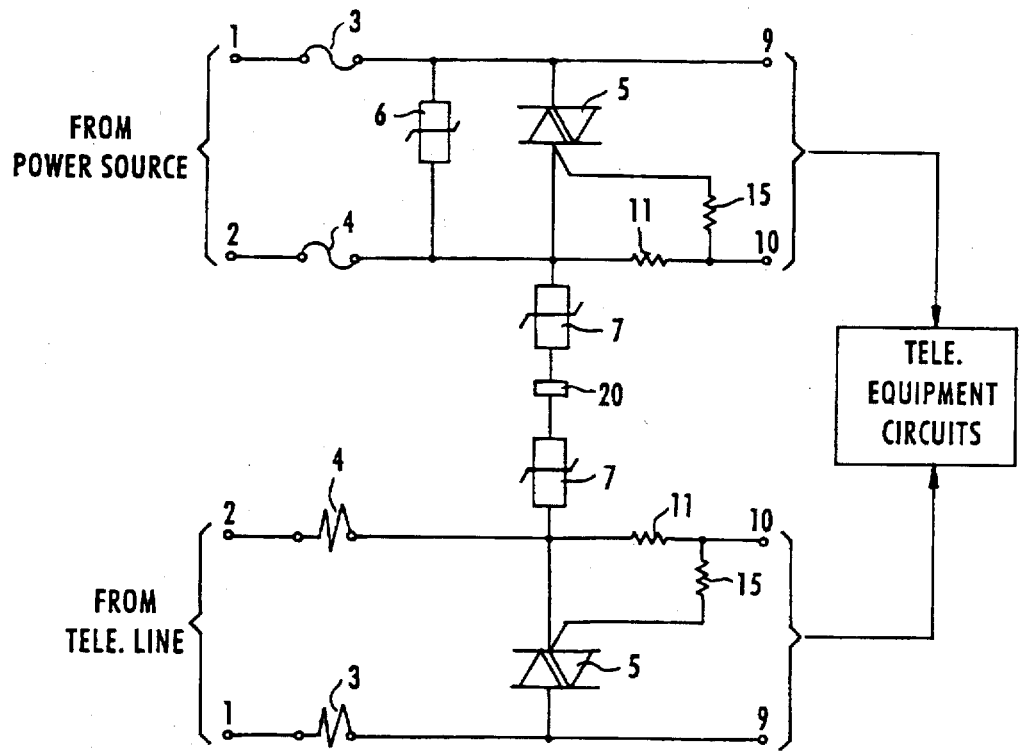
FIGS. 6 and 7 show circuit arrangements that may be protected by the present invention.
Figure 7:
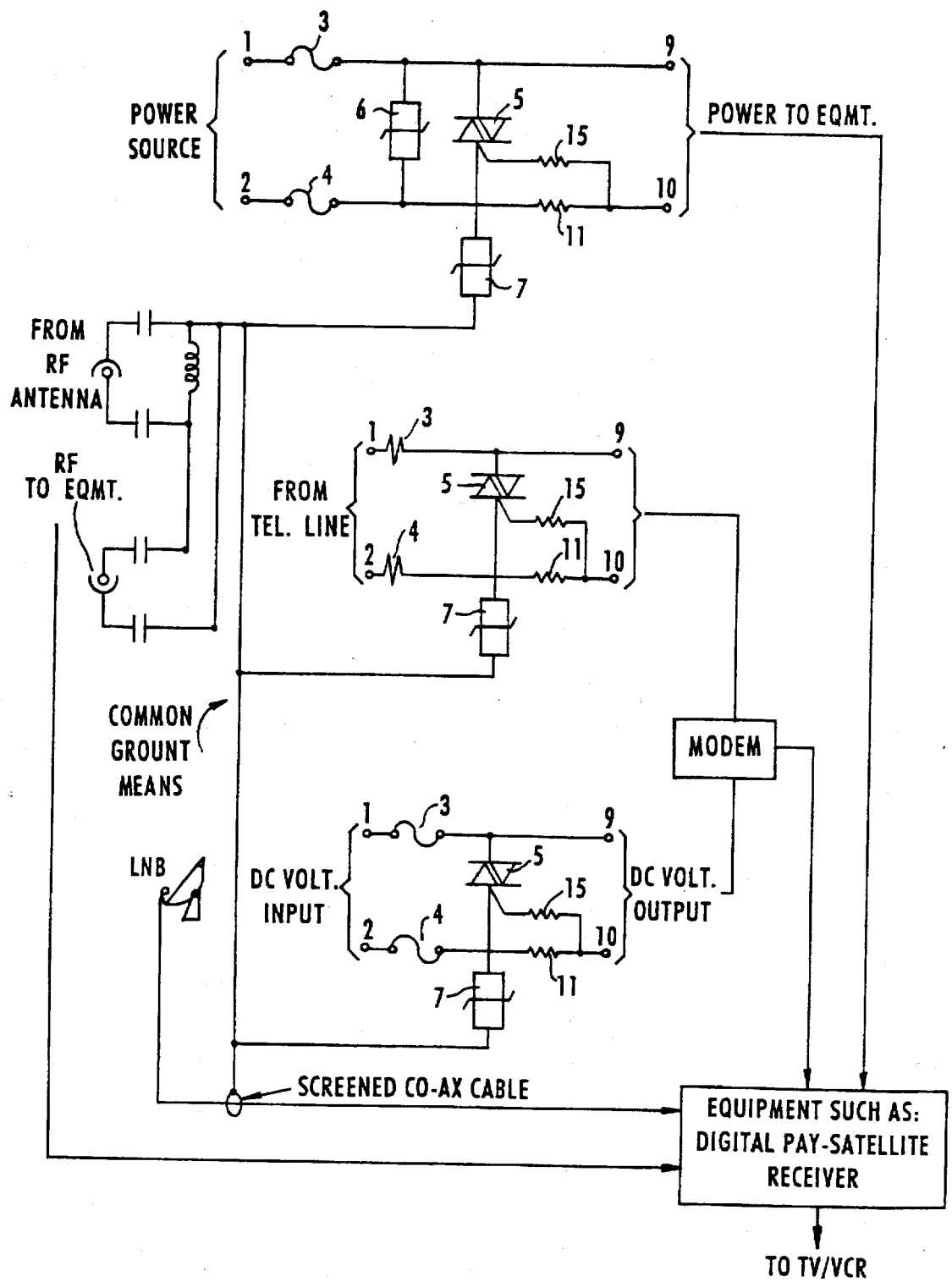
Figure 8:
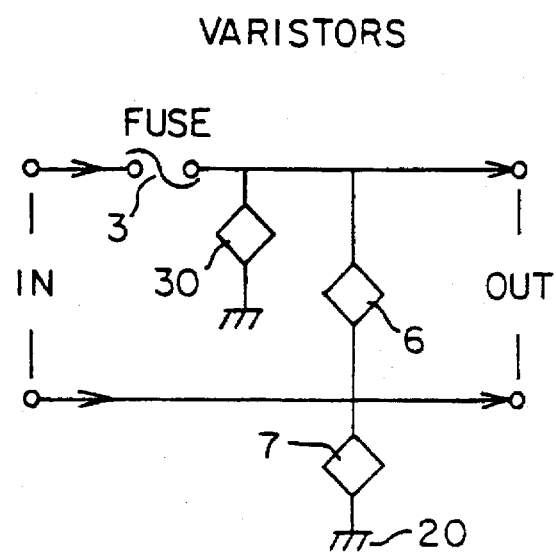
FIGS. 8 and 9 illustrate prior art arrangements.
Figure 9:
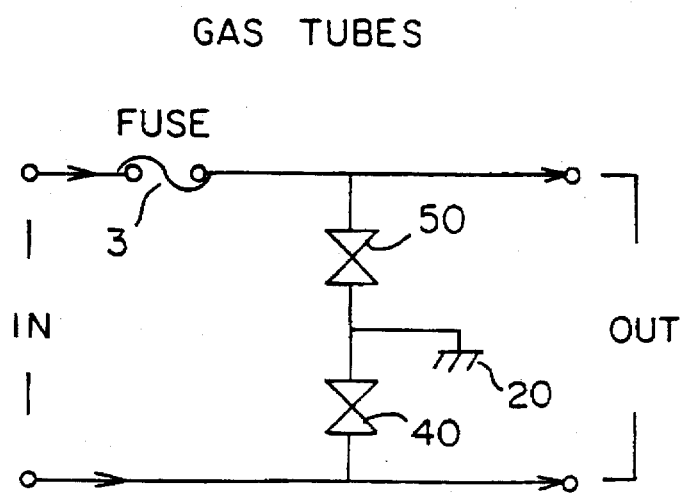

Circuit arrangements that may be protected by the present invention include, for example:

(a) one in which the input elements are connected to electrical energy supply whose static potential is limited via a common ground to antenna lines of one of a receiving device and/or a transmitted device;

(b) one in which an electromagnetic interference filter (EMI Filter) is connected between a source and the input element of this invention (FIG. 5); or (c) there is a plurality of circuits each coordinated to a common ground/means, wherein individual circuits may be embodied in the same or separate units connected between the equipment to be protected and various electrical energy supply lines and telecommunication lines and/or antenna lines and/or data transmission lines (FIG. 7).

Also provided herein is a table summarizing the distinctions and advantages of the present invention over the prior art.

| Present Invention FIG. 1 | State of The Art VARISTORS | State of The Art GAS TUBES |
|---|---|---|
| 1. Predeterminable over-current activated absorbing means (5). | 1. Respond to over-voltage only. Harmful current can flow through (bad for tete equipment) | 1. Respond to over-voltage only. Harmful current can flow through. |
| 2. Static limiting means (7) protected by 3 and/or 4. | 2. Static limiting means (7) not protected. | 2. Static limiting means (40). Not totally protected. |
| 3. Absorbing means (5) protected by 3 and/or 4. | 3. Clamping means (6) survives if heat build-up is not too much before fuse (3) blow o.o. | 3. Clamping-absorbing means (40,50). Not totally protected. |
| 4. Current does not flow through circuit at output to cause 3 and/or 4 to blow o.c. | 4. High current still flow through circuit at output. | 4. Current does not flow through output circuit if 40 or 50 not damaged yet. |
| 5. 3 and/or 4 o.c. accelerated by shorting of (5). | 5. 3 depends on current flowing through outputs and clamping means (6) to o.c. | 5. o.c. of '3' accelerated if 40 or 50 not damaged yet. |
| 6. Shorting of (5) reduces heat build-up (1A × 1V = 1 WATT) | 6. Clamping means (6) at (X) volt has high heat build-up. (1A × (X)V = (X) WATT) | 6. High heat build-up at gas tube depending on sustaining voltage when activated. |
| 7. Only 3 and/or 4 will blow o.c. | 7. Any component can be o.c. | 7. Gas tubes (besides being radio active) can be blown easily due to cracked embodiments. |
| 8. Can survive multiple servers in-circuit strikes and inter-circuit strikes. | 8. Can survive one severe strike or several mild strikes. | 8. Can survive several severe strikes or one severe inter-circuit strike. |

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A surge protecting apparatus for protecting electrical equipment from a power surge, comprising:

first isolation means connected in series between a first input means and a first output means;

second isolation means connected in series between a second input means and a second output means;

absorbing means connected in parallel between outputs of the first and second isolation means for absorbing energy delivered via the first and second isolation means when activated;

overcurrent sensing means connected between the second isolation means and the second output means, for sensing an overcurrent and for activating the absorbing means in response to the sensed overcurrent; and a static potential limiting means connected between the absorbing means and a ground means, said second isolation means, said absorbing means and said static potential limiting means being connected at a common node, wherein the static potential limiting means enables said common node to be connected to ground means, in response to an overvoltage; and wherein, each isolation means is appropriately selected so that it will (a) protect the absorbing means which will be activated to become short-circuited when a predetermined level of overcurrent is detected by the overcurrent sensing means in order to prevent harmful in-circuit surge from reaching the electrical equipment via the output means, and (b) protect the static potential limiting means which prevents harmful inter-circuit voltage surge, in relation to ground potential, from reaching the electrical equipment.

2. The apparatus according to claim 1, wherein:

the first and second input means are connected to receive electrical input from one of telecommunications lines and data lines.

3. The apparatus according to claim 1, wherein:

the first and second input means are connected to electrical energy supply lines.

4. The apparatus according to claim 1, wherein:

the first and second input means are connected to electrical energy supply lines whose static potential is limited via a common ground means to antenna lines of one of a receiving device and a transmitting device.

5. The apparatus according to claim 1, further comprising:

an electromagnetic interference filter (EMI filter) connected to the first and second input means.

6. The apparatus according to claim 1, respectively provided to a plurality of individual circuits, wherein the individual circuits are embodied in at least one separate unit connected between equipment which is to be protected and any combination of energy supply lines, telecommunication lines, antenna lines, and data transmission lines.

7. The apparatus according to claim 1, respectively provided to a plurality of electrical circuits coordinated to a common ground means.

8. The apparatus according to claim 1, wherein:

the absorbing means comprises a TRIAC.

9. The apparatus according to claim 1, further comprising:

clamping means connected in parallel to the absorbing means between the outputs of the first and second isolation means.

10. The apparatus according to claim 1, further comprising:

a DIAC and a TRIAC coupled together to deny equipment connected to the output means access if any one of other equipment connected in parallel to the same input means is already in-use.

11. A method of absorbing and isolating a harmful electrical surge, for equipment-circuit protection, comprising the steps of:

providing a protection circuit including at least two input means, two suitably selected isolation means respectively connected in series with the two input means, a suitable absorbing means connected in parallel at the outputs of the isolation means, an overcurrent sensing means connected in series between an isolation means and one of two output means suitably connected to trigger the absorbing means, and a static potential limiting means connected to the output of one of said two isolation means, enabling said isolation means to be connected to a ground means; and employing an isolation means which is appropriately selected so that it will (a) protect the absorbing means which will be activated to become short-circuited when a predetermined level of overcurrent is detected by the overcurrent sensing means in order to prevent harmful in-circuit surge from reaching the equipment-circuit via the output means, and (b) protect the static potential limiting means which prevents harmful inter-circuit voltage surge, in relation to ground potential, from reaching the equipment-circuit.

12. The method according to claim 11, further comprising:

connecting the two input means to one of telecommunications lines, and data lines.

13. The method according to claim 11, further comprising:

connecting the two input means to electrical energy supply lines.

14. The method according to claim 11, further comprising:

connecting the two input means to an electrical energy supply whose static potential is limited via a common ground means to antenna lines of one of a receiving device and a transmitting device.

15. The method according to claim 11, further comprising:

connecting the two input means to electrical energy supply lines and telecommunications lines employing separate circuits coordinated to a common ground means.

16. The method according to claim 11, further comprising:

arranging a plurality of protection circuits embodied in a separate unit connected between equipment to be protected and any combination of electrical energy supply lines, telecommunications lines, antenna lines, and data lines, with each protection circuit coordinated to a common ground means.

17. The method according to claim 11, comprising the further step of:

connecting an electromagnetic interference filter (EMI Filter) in series with the first and second input means.

18. The method according to claim 11, further comprising:

arranging a plurality of input sources employing a respective plurality of said protection circuits, each coordinated to a common ground means.

* * * * *